(12) United States Patent
Mathews, Jr. et al.

(10) Patent No.: US 9,145,202 B2
(45) Date of Patent: Sep. 29, 2015

(54) METHOD FOR INTEGRATING ENGINE CONTROL AND FLIGHT CONTROL SYSTEM

(71) Applicant: GENERAL ELECTRIC COMPANY, Schenectady, NY (US)

(72) Inventors: Harry Kirk Mathews, Jr., Schenectady, NY (US); Sridhar Adibhatla, Glendale, OH (US); Jeffrey Russell Bult, Grand Rapids, MI (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/159,490

(22) Filed: Jan. 21, 2014

(65) Prior Publication Data

US 2014/0136030 A1    May 15, 2014

Related U.S. Application Data

(62) Division of application No. 13/221,102, filed on Aug. 30, 2011, now Pat. No. 8,634,972.

(51) Int. Cl.
*B64C 19/00* (2006.01)
*H04B 7/185* (2006.01)
*B64D 31/06* (2006.01)

(52) U.S. Cl.
CPC ............... *B64C 19/00* (2013.01); *B64D 31/06* (2013.01); *H04B 7/18506* (2013.01); *F05D 2260/80* (2013.01)

(58) Field of Classification Search
CPC ............................... B64D 31/06; B64C 19/00
USPC ....................................................... 701/3, 99
See application file for complete search history.

(56) References Cited

U.S. PATENT DOCUMENTS 6,353,734 B1    3/2002    Wright et al.
7,438,259 B1    10/2008    Piasecki et al.
(Continued)

FOREIGN PATENT DOCUMENTS

WO        2011053805 A1    5/2011

OTHER PUBLICATIONS

T. Tucker, "Harnessing the Brute: The Development of Propulsion Controlled Aircraft at NASA Dryden," Mar. 15, 1999, Journal abbreviation STAR, vol. 37, 2 pages.
(Continued)

*Primary Examiner* — Mary Cheung
*Assistant Examiner* — Michael Berns
(74) *Attorney, Agent, or Firm* — John P. Darling

(57) ABSTRACT

A method of operating an aircraft system includes receiving flight information and trajectory intent information other than current values by an engine control system associated with an engine of the aircraft system from a flight control system associated with the aircraft system; and operating an engine associated with the engine control system using the received non-current information. An aircraft includes an engine positioned on the aircraft; a full authority digital engine controller (FADEC) communicatively coupled to the engine; and a flight control system positioned on the aircraft and communicatively coupled to the FADEC, the flight control system configured to transmit other than current values of flight information and trajectory intent information to the FADEC and to receive other than current values of at least one of engine health and parameters used to estimate engine health from at least one of the FADEC and a separate flight control center positioned offboard the aircraft.

11 Claims, 2 Drawing Sheets

(56) References Cited

U.S. PATENT DOCUMENTS

| | | |
|---|---|---|
| 7,774,106 B2 | 8/2010 | Calandra et al. |
| 7,931,231 B2 * | 4/2011 | Cherepinsky et al. ..... 244/17.13 |
| 7,949,440 B2 | 5/2011 | Ramos et al. |
| 2001/0044680 A1 | 11/2001 | Lemelson et al. |
| 2007/0050101 A1 | 3/2007 | Sacle et al. |
| 2008/0039076 A1 | 2/2008 | Ziarno et al. |
| 2008/0283671 A1 * | 11/2008 | Cherepinsky et al. ........ 244/195 |
| 2009/0026504 A1 | 1/2009 | Okuda et al. |
| 2009/0326745 A1 | 12/2009 | Ramos et al. |
| 2010/0324758 A1 | 12/2010 | Piasecki et al. |
| 2011/0046818 A1 | 2/2011 | Herkes et al. |

OTHER PUBLICATIONS

C. L. Hall et al., F/A-18E/F F414 Advanced Inflight Engine Condition Monitoring System (IECMS), IEEE—F/A-18E/F IECMS Paper, vol. 6, Mar. 17, 2001, pp. 6-3069-6-3082.

* cited by examiner

METHOD FOR INTEGRATING ENGINE CONTROL AND FLIGHT CONTROL SYSTEM

CROSS REFERENCE TO RELATED APPLICATION

This application is a divisional of U.S. application Ser. No. 13/221,102, filed Aug. 30, 2011, now U.S. Pat. No. 8,634,972.

BACKGROUND OF THE INVENTION

The field of the invention relates generally to flight control systems, and more specifically, to methods and systems for integrating engine control and a flight control system.

At least some known aircraft include an engine control system, sometimes referred to as a full authority digital engine control (FADEC). The FADEC is a system that includes a digital computer and its related accessories that control all aspects of aircraft engine performance. The FADEC receives multiple current input variables of the current flight condition including, for example, but not limited to, air density, throttle lever position, engine temperatures, engine pressures, and current values of other engine parameters. The inputs are received and analyzed many times per second. Engine operating parameters such as fuel flow, stator vane position, bleed valve position, and others are computed from this data and applied as appropriate to provide optimum engine efficiency for a given current flight condition.

The aircraft also typically include a flight control system, which may include a system typically referred to as a flight management system (FMS). The FMS is a specialized computer system that automates a wide variety of in-flight tasks, including the in-flight management of the flight plan. Using various sensors, such as, but not limited to, global positioning system (GPS), inertial navigation system (INS), and backed up by radio navigation to determine the aircraft's position, the FMS guides the aircraft along the flight plan. From the cockpit, the FMS is normally controlled through a Control Display Unit (CDU) which incorporates a small screen and keyboard or touch screen. The FMS transmits the flight plan for display on the EFIS, Navigation Display (ND) or Multifunction Display (MFD).

The FADEC and FMS are separate system that in some cases may communicate current values of parameters. However, many parameters that reside in the FADEC that would be useful to the FMS and many parameters that reside in the FMS that would be useful to the FADEC are not communicated between the two separate systems.

BRIEF DESCRIPTION OF THE INVENTION

In one embodiment, a method of operating an aircraft system includes receiving flight information and trajectory intent information other than current values by an engine control system associated with an engine of the aircraft system from a flight control system associated with the aircraft system and operating an engine associated with the engine control system using the received non-current information.

In another embodiment, an aircraft includes an engine positioned on the aircraft, a full authority digital engine controller (FADEC) communicatively coupled to the engine, and a flight control system positioned on the aircraft and communicatively coupled to the FADEC, the flight control system configured to transmit other than current values of flight information and trajectory intent information to the FADEC and to receive other than current values of at least one of engine health and parameters used to estimate engine health from at least one of the FADEC and a separate flight control center positioned offboard the aircraft.

BRIEF DESCRIPTION OF THE DRAWINGS

FIG. 1 is a schematic block diagram of an integrated engine control and flight control system in accordance with an exemplary embodiment of the present invention;

FIG. 2 is a flow chart of a method of operating an aircraft system in accordance with an exemplary embodiment of the present invention; and FIG. 3 is a flow chart of a method 300 of operating an aircraft system in accordance with another embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of system communication in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
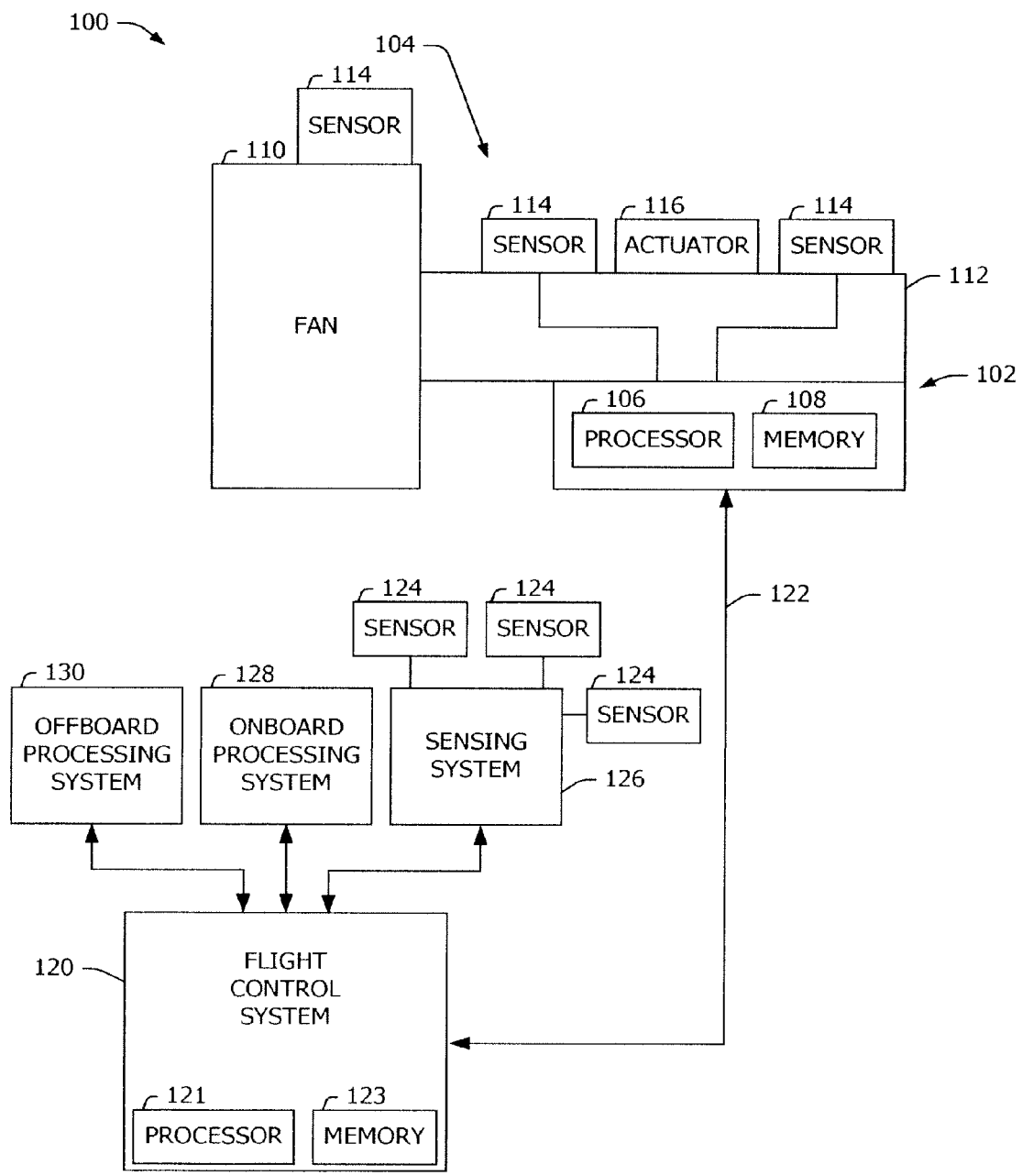
FIGS. 1-3 show exemplary embodiments of the method and system described herein.

FIG. 1 is a schematic block diagram of an integrated engine control and flight control system 100 in accordance with an exemplary embodiment of the present invention. In the exemplary embodiment, integrated system 100 includes an engine control system 102 such as, but not limited to, a full authority electronic digital control (FADEC) system mounted proximate to an associated aircraft engine 104. Engine control system 102 includes a processor 106 and a memory 108 communicatively coupled to processor 106. Engine 104 includes a fan 110 and a core engine 112 in serial flow communication. In some embodiments, substantially all air flow through fan 110 goes through core engine 112. In various embodiments, engine 104 is a high bypass type engine and only a portion of the airflow entering fan 110 passes through core engine 112. Although described as a FADEC, in various embodiments, engine control system 102 may include other forms of engine controller capable of operating as described herein.

A plurality of process sensors 114 are positioned about engine 104 to sense process parameters associated with engine 104. Such process parameters include for example, engine speed, fuel flow, damper and guide vane positions, stator vane clearance, as well as various temperatures of components in engine 104. Sensors 114 are communicatively coupled to engine control system 102. In addition, one or more actuators 116 are positioned about engine 104 and are operably coupled to components of engine 104 to effect the operation of those components. Actuators 116 are also communicatively coupled to engine control system 102. Sensors 114 and actuators 116 are used by engine control system 102 to determine operating conditions of engine 104, including but not limited to, a performance of engine 104 relative to a baseline or new operating condition. Engine control system 102 may then operate actuators 116 to account for deterioration and/or damage to engine 104 between overhauls. Engine control system 102 may also use sensors 114 and actuators 116 to store the determined engine condition for future reference, further processing, and/or reporting.

System 100 also includes a flight control system 120 communicatively coupled to engine control system 102 through a communications channel 122. Flight control system 120 includes a processor 121 and a memory 123 communicatively coupled to processor 121. In the exemplary embodiment, communications channel 122 is a wired connection between engine control system 102 and flight control system 120. In various other embodiments, communications channel 122 may be a wireless communication medium. In the exemplary embodiment, flight control system 120 is located proximate a cockpit (not shown) of the aircraft and engine control system 102 is located proximate the engine to which it is associated. Flight control system 120 may be embodied in a single processor-based component or the functions of flight control system 120 may be carried out by a plurality of components configured to perform the functions described herein. Some of the components performing the functions of flight control system 120 may be located proximate the cockpit and others may be distributed inside the aircraft for convenience, safety, and/or optimal operational considerations. Although an flight control system is described herein as a flight management system (FMS), it is to be understood that the invention includes communication between an engine controller and any aircraft-mounted avionics function.

Flight control system 120 is configured to interface with various other systems both onboard the aircraft and offboard the aircraft. For example, flight control system 120 may receive current aircraft status from a plurality of aircraft sensors 124 through a sensing system 126. Such sensors may include pitot tubes for determining airspeed, gyros, compasses, accelerometers, position sensors, altimeters, and various other sensors that may be able to detect a condition, status, or position of the aircraft. Flight control system 120 may also receive information from one or more onboard processing systems 128, which may be standalone systems or systems having functions distributed across several computer systems. Flight control system 120 and onboard processing systems 128 may communicate using a wired communications channel and/or network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. As used herein, a wired communications channel includes channels that use fiber and other optical means for communications. Flight control system 120 may also receive information from one or more offboard processing systems 130, which may be standalone systems or systems having functions distributed across several computer systems and/or several sites. Offboard processing systems 130 and flight control system 120 are communicatively coupled using one or more wireless communications media including, but not limited to, radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means.

Figure 2:
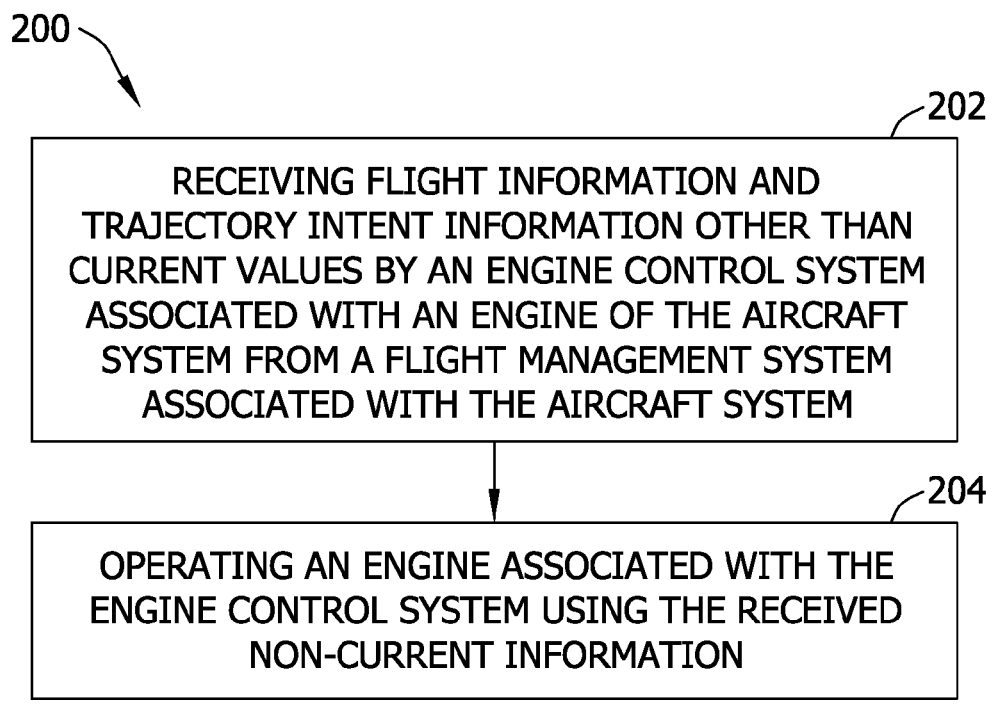
Figure 3:
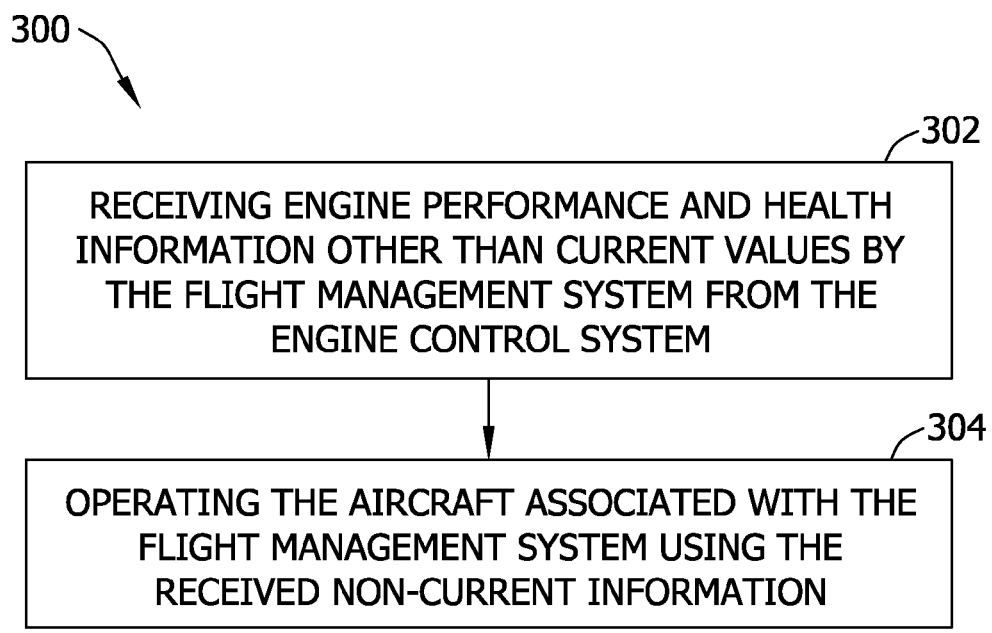

FIG. 2 is a flow chart of a method 200 of operating an aircraft system in accordance with an exemplary embodiment of the present invention. FIG. 3 is a flow chart of a method 300 of operating an aircraft system in accordance with another embodiment of the present invention. In the exemplary embodiment, method 200 includes receiving 202 flight information and trajectory intent information other than current values by an engine control system associated with an engine of the aircraft system from a flight control system associated with the aircraft system and operating 204 an engine associated with the engine control system using the received non-current information. Method 300 includes receiving 302 engine performance and health information other than current values by the flight control system from the engine control system and operating 304 the aircraft associated with the flight control system using the received non-current information. In various embodiments, the engine control system is a full authority digital engine control (FADEC) and the engine performance and health information includes an estimate of engine health and parameters used to estimate engine health. Engine control system 102 may evaluate current readings of various parameters of the aircraft engine and generate an estimate of the engine health. Either the estimate of engine health generated by engine control system 102 or the parameters used to generate the estimate of engine health are transmitted to flight control system 120 for further processing and/or action by flight control system 120. Specifically, the engine performance and health information may include an estimate of engine thrust capability.

Additionally, the flight information and trajectory intent information transmitted from flight control system 120 to engine control system 102 may include at least one of planned future flight conditions of the aircraft and predicted future flight conditions of the aircraft. Such information would permit engine control system 102 to prepare the engine for maneuvers that would otherwise be limited or controlled more closely. For example, during a cruise phase of flight an active clearance control system (not shown) may permit a tip gap between a rotating blade tip on a rotor of the engine and a casing of the engine to be reduced. Reducing the tip gap reduces an amount of leakage past the blade tip, which improves a performance of the engine. If the aircraft needs to execute a step change in altitude, such as, an increase in altitude to maneuver over weather, head winds, turbulence, or precipitation, an increase in engine power to effect the change may cause the blade tips to rub the casing if remedial steps are not taken with sufficient lead time. In the casing of an active clearance control system, the casing may need a certain amount of time to change temperature, which in turn changes the blade tip gap. If the increase in engine power is undertaken before the casing has reached a proper temperature, a rub could result. Flight control system 120 can predict or plan for such step altitude changes and transmit such changes to engine control system 102 prior to the time the step change will start. Accordingly, engine control system 102 can affect the changes to the engine in enough time to permit the increase in power of the engine without causing a blade tip rub. Communication between engine control system 102 and flight control system 120 permits engine control system 102 to act on information provided by flight control system 120 to control the engine and permits flight control system 120 to control aircraft systems based on information provided by engine control system 102 to improve the performance of the entire aircraft system.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 106, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is communicating aircraft system information to an engine control system for changing the operation of the engine based on the aircraft system information. Moreover, information external to the aircraft may be communicated to the engine control system, such as weather and air traffic control information to permit controlling the engine operation based on the external information. Furthermore, engine health and maintenance requirements are communicated to the flight control systems to control an operation of the aircraft based on the engine information. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of communicating information between an engine control system and flight control system to modify the operation of the aircraft engine or aircraft systems based on the communicated information provides a cost-effective and reliable means improving the performance and operation of the aircraft system. More specifically, the methods and systems described herein facilitate modifying engine operation based on aircraft system information. In addition, the above-described methods and systems facilitate modifying operation of the aircraft based on information communicated to the flight control system from the engine control system. As a result, the methods and systems described herein facilitate operation of the aircraft system in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of operating an aircraft system, the method comprising;
    receiving flight information and trajectory intent information other than current values by an engine control system associated with an engine of the aircraft system from a flight control system associated with the aircraft system;
    operating an engine associated with the engine control system using the received non-current information;
    receiving engine performance and health information other than current values by the flight control system from the engine control system; and
    operating the aircraft associated with the flight control system using the received non-current information.

2. A method in accordance with claim 1, wherein receiving engine performance and health information comprises receiving at least one of an estimate of engine health and parameters used to estimate engine health.

3. A method in accordance with claim 1, wherein receiving engine performance and health information comprises receiving an estimate of engine thrust capability.

4. A method in accordance with claim 1, wherein the engine control system is a full authority digital engine control (FADEC).

5. A method in accordance with claim 1, wherein receiving flight information and trajectory intent information comprises receiving at least one of planned future flight conditions of the aircraft and predicted future flight conditions of the aircraft.

6. A method in accordance with claim 5, wherein receiving at least one of planned future flight conditions of the aircraft and predicted future flight conditions of the aircraft comprises receiving an indication of a future change in altitude of the flight path.

7. A method in accordance with claim 5, wherein receiving at least one of planned future flight conditions of the aircraft and predicted future flight conditions of the aircraft comprises receiving weather conditions.

8. A method in accordance with claim 5, wherein receiving engine performance and health information comprises receiving an estimate of engine thrust capability.

9. An aircraft comprising:
    an engine positioned on the aircraft;
    a full authority digital engine controller (FADEC) communicatively coupled to the engine; and
    a flight control system positioned on the aircraft and communicatively coupled to the FADEC, the flight control system configured to transmit other than current values of flight information and trajectory intent information to the FADEC and to receive other than current values of at least one of engine health and parameters used to estimate engine health from at least one of the FADEC and a separate flight control center positioned offboard the aircraft.

10. A system in accordance with claim 9, wherein the flight information and trajectory intent information includes an indication of a future change in altitude of the flight path.

11. A system in accordance with claim 10, wherein the FADEC modifies the operation of the engine using the indication of a future change in altitude of the flight path.

* * * * *